Sept. 15, 1936.        L. KÜRTÖSSY        2,054,329
FRICTION SHOCK ABSORBING DEVICE
Filed Nov. 21, 1935        2 Sheets—Sheet 1
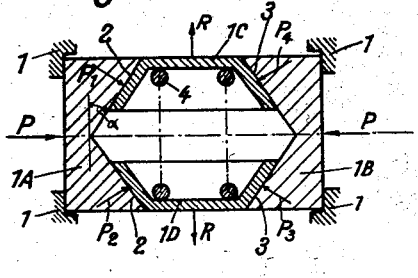
Fig. 1
Fig. 2
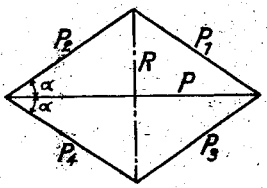
Fig. 3
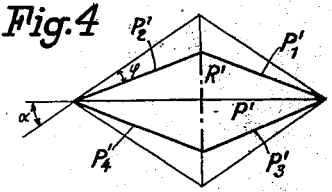
Fig. 4
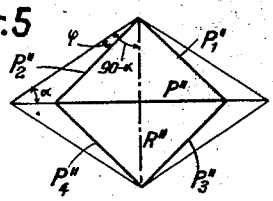
Fig. 5
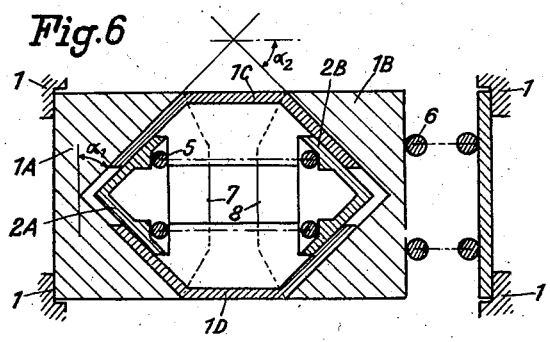
Fig. 6
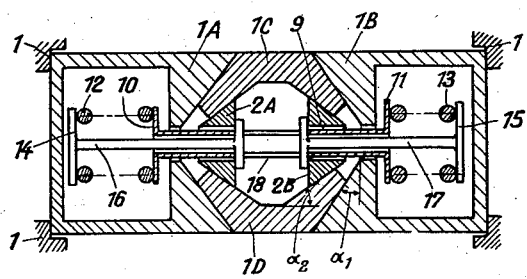
Fig. 7
Inventor:
László Kürtössy
By Lager & Malcolm,
Attorneys Sept. 15, 1936.  L. KURTÖSSY  2,054,329
FRICTION SHOCK ABSORBING DEVICE
Filed Nov. 21, 1935  2 Sheets-Sheet 2
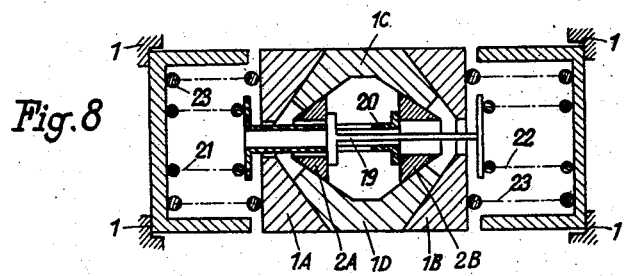
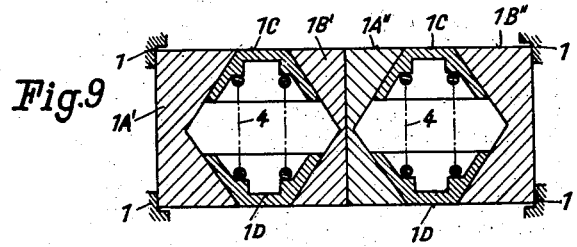
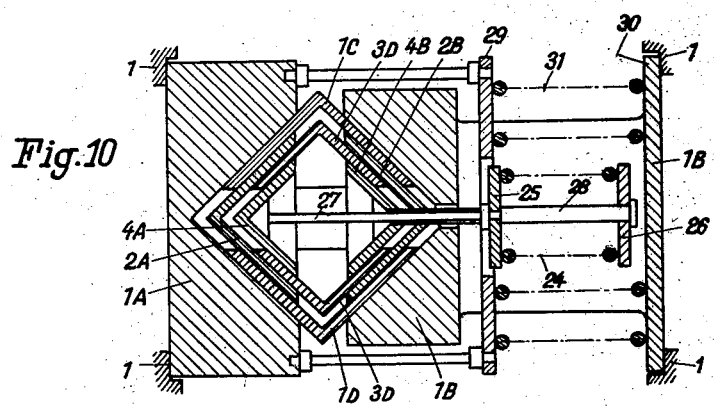
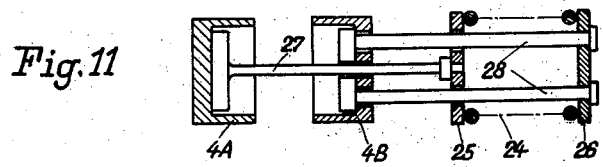
Inventor:
László Kurtössy
By Sager & Malcolm,
Attorneys Patented Sept. 15, 1936

2,054,329

UNITED STATES PATENT OFFICE 2,054,329

FRICTION SHOCK-ABSORBING DEVICE

László Kürtössy, Budapest, Hungary

Application November 21, 1935, Serial No. 50,877
In Germany November 1, 1934

9 Claims. (Cl. 213—37)

The present invention concerns a device in which the kinetic energy of moving masses is intercepted or annihilated with the aid of relatively low spring forces, by using friction faces.

In the already known devices of this kind, either the friction faces bear such high pressures per surface unit that they must be permanently greased, so as to avoid jamming of the faces, or there is the drawback that even with a friction coefficient augmenting but a little, the devices—after buffing—do not return into their original position, or else they jam while buffing, i. e. during the working stroke; the present invention is intended to eliminate all these disadvantages, while requiring a minimum of space.

Some devices are known, in which this is obtained by a certain disposition of the friction faces and spring, whereby the buffing plates, which approach mutually under draft or buffing forces, have on their inner side a depression formed by faces placed obliquely to the buffing direction, while friction blocks are placed between these oblique faces of the depression, these blocks approaching mutually under buffing strains, perpendicularly to the buffing direction and against the action of a spring. The device obtained with this disposition is useful for small work only, while its dimensions must be small; however, it does not jam, even if the friction coefficient augments considerably.

According to the present invention, this disposition presents the simple possibility of a rapid increase of the ratio: buffing force to spring force, and thereby also of the power of the device, because the mutual disposition of the spring and friction faces permits to encase several friction elements one into the other, with a single inside-acting spring. The ratio can thus be potentiated in such a way that it augments according to the succession $x$, $x^2$, $x^3$ etc, contrary to the already known devices, where the ratio—with a device repeated several times—augments according to the succession $x$, $2x$, $3x$ etc. Therefore the repetition of the device forming the object of the present invention does not represent a simple juxtaposition of elements similar in form and dimensions, but an encasing in similar but bigger elements which enclose the smaller ones.

A model execution is shown in the following drawings:

Figs. 1, 6, 7, 8, 9, and 10 are horizontal sections,
Figs. 2 and 11 are side view and vertical section corresponding to Figs. 1 and 10 respectively;

Fig. 3 shows the paralleogram of forces corresponding to Fig. 1, without friction;

Fig. 4 shows the same under friction, during the working stroke of the device.

Fig. 5 is a similar diagram of the backstroke of the device.

The plan can also be considered as side view; in this case, the side view must naturally be considered as plan. As the parts generally fixed to the car, such as guides, draft links, which enable the same device to transmit also draft strains, etc., do not belong to the object of the present invention, they are not shown in the drawings.

Figs. 1 and 2 show a disposition in which one pair of friction blocks is utilized. The buffing plates IA and IB, fixed between the stops 1 on the underframe of the car, are mobile in the direction of the forces P, —P; on their inner sides are depressions formed by the oblique faces 2, 3. The friction blocks IC, ID, placed between these oblique faces, being held separated by a spring 4, approach mutually during the buffing stroke of the buffing plates. If the force P or —P ceases to act, the spring pushes the two blocks IC, ID and thereby also the buffing plates IA, IB back into their original extended position.

By reason of the friction acting upon the faces 2, 3 during the movements of the device, part of the work of the force P while compressing, and part of the work of the spring while extending, is transformed into friction work. Consequently, on one hand a smaller spring force R can be utilized, and on the other hand the undesirable reaction force P" of the already small spring is further reduced.

Fig. 3 shows the parallelogram of forces, in the case of $\mu=tg\phi=0$, i. e. if there is supposed to be no friction; Fig. 4 shows the parallelogram of forces during compression, i. e. during the working stroke, if $\mu=tg\phi$ is the friction coefficient on the friction faces. Fig. 4 shows that during the working stroke, the counter force R', being opposite to the pressure force P', and counter-balancing the latter, becomes equal to 0 if $\phi=\alpha$, $(\phi=90°-\alpha)$; in other words: with this friction coefficient, no spring force is necessary to balance a pressure force of any amount of importance. This is the case if, during the pressure stroke, the device becomes self-locking, i. e. gets jammed. From the above, there follows that $\alpha=45°$ gives the maximum safety as regards the requirement that no jamming shall occur during the working stroke and the back stroke. In the case of $\alpha=45°$, jamming would only occur with a most unlikely friction coefficient of $\mu = tg\ 45° = 1$.

The proportional number P', R' shows what a big ratio has been achieved by using the friction faces during the working stroke, the bigger this proportional number is in a device, the smaller a spring force suffices to obtain a given big amount of working capacity.

Fig. 4 shows furthermore that the ratio P', R', during the working stroke is of better advantage, i. e. bigger if $\alpha$ is smaller.

Fig. 5 shows the ratio during the back stroke, the forces P'', R'' being similar in effect but opposite to the forces P', R' of Fig. 4.

After due consideration of these contrary conditions as well as of the requirements concerning jamming, it is found that the best results are obtained with an angle $\alpha$ lying between 30° and 40°.

Figs. 6 and 7 show the way in which the principle of Fig. 1 may be applied two times, in view of augmenting the ratio P, R, i. e. to increase a second time the spring force. The inner oblique faces of the friction blocks IC, ID are also executed as friction faces, and another set of inner friction blocks 2A, 2B is encased between them. Instead of the spring 4, a spring 5 is inserted between these inner friction blocks.

If, in this case, the angle $\alpha$ of Fig. 1 is called $\alpha_1$ and the corresponding angle of the second step $\alpha_2$, that which has been said before on the subject of jamming and ratio now also concerns this second step; the outer friction blocks IC, ID correspond to the buffing plates IA, IB and the inner friction blocks 2A, 2B correspond to the friction blocks IC, ID.

Therefore this second step or inner disposition keeps all the features of the outer step and shows no new ones. If for example the outer disposition was not self-locking, the inner disposition shows the same safety against jamming, supposing naturally that $\alpha_2 = \alpha_1 = \alpha$. If for example, in the execution according to Fig. 1, the ratio P, R amounted to $x$, the same ratio also exists in the inner disposition, naturally always supposing that $\alpha_2 = \alpha_1 = \alpha$. Therefore, the ratio of the two-stepped disposition amounts to $x^2$, as compared to the ratio $x$ of the one-stepped disposition.

This is a difference in comparison to the other known devices, in which—when the disposition is repeated twice—the ratio is only of $2x$.

Figs. 6 and 7 are drawn according to the condition $\alpha_2 = \alpha_1 = \alpha$, with the difference that in Fig. 7 $\alpha$ may be any angle, and in Fig. 6 $\alpha = 45°$. In view of obtaining the ratio P, R for the disposition shown in Fig. 6, the subdivision according to Fig. 4, 5 would have to be continued in the given sense.

As the ratio augments with the double execution, the initial amount of the buffing force—which corresponds to the initial tension of the spring 5—augments as well. In order that it may not become too important, a preliminary spring 6 can be inserted before the device. In this way, the device can receive a diagram having any initial course desired.

If $\alpha_2 = \alpha_1 = 45°$, Fig. 6, the stroke of the spring 5 is exactly as long as that of the bodies IA, IB, which, for example, can be limited by the stops 7, 8.

Figs. 1, 6, and 10 show furthermore that with friction elements disposed 1, 3, etc. times, the spring is placed perpendicularly to, and with elements disposed 2, 4 etc. times in the direction of the force P.

In Figs. 1 and 6, the spring is placed on the inside of the friction elements, in Figs. 7, 8, and 10 on the outside, but in the latter case their action is the same, by the insertion of a rodding.

When executed as shown in Fig. 7 for example, this rodding consists of a tube 9, the two extremities of which are bearing the spring plates 10, 11. The outer ends of the springs 12, 13 act upon the spring plates 14, 15. The bars 16, 17 forming one body with these spring plates, possess T-shaped heads which pass through the slot 18 of the tube 9 and act upon the friction blocks 2A, 2B.

In the execution according to Fig. 8, this rodding distinguishes itself from that of Fig. 7 in that the friction blocks 2A, 2B are actuated by the inner ends of the springs 21, 22 with the aid of a bar 19 and tube charged with the pressure and not with the traction force. At the same time, the outer ends of the springs 21, 22 act as preliminary springs which push back the buffing plates IA, IB into their extended positions, after buffing is terminated.

If the device according to Fig. 1 or Fig. 6 is executed two times, three times, consecutively, in the direction of the buffing force, Fig. 9, this disposition presents the double, treble, stroke, while the starting and terminating values of the buffing force remain the same.

If the two devices according to Fig. 9 are executed in such a way that the buffing plates IA' and IA'', IB, and IB'' respectively form one piece, this disposition presents the double of the buffing forces in comparison to the execution according to Fig. 1, while the stroke remains the same.

Instead of doubling the principle shown in Fig. 1, it may also be applied three or four times. This latter case is shown in Figs. 10 and 11. The friction blocks 3C, 3D and 4A, 4B are added to the friction blocks of the double execution. The force of the spring 24 acts upon the friction blocks 4A, 4B, because the left and right ends of the spring, with the aid of the spring plates 25 and 26 and bars 27, 28, move the friction blocks 4A and 4B. This also guarantees that the same force shall act upon the blocks 4A, 4B as with the spring 5 placed on the inside, Fig. 6. In this execution the ratio is so high, that a small spring 24 is sufficient to obtain important buffing forces. As this spring is not always sufficient to bring back the coupler and the pressure bar into their original position with enough force, auxiliary springs 31 are inserted between the plates 29, 30 which are in connection with the buffing plates IA, IB. These auxiliary springs 31 continually tend to separate the two bodies IA, IB, and the spring 24, while extending, has only to place back the friction bodies into their original positions.

With this quadruple execution, the ratio amounts to $x^4$ as compared to the ratio $x$ of the execution shown in Fig. 1, presuming that the obliquity of the slanting faces remains the same.

With a treble execution, the friction blocks 4A, 4B are eliminated, and the spring acts directly upon the friction blocks 3C, 3D, perpendicularly to the direction of the force P. With this execution, the ratio amounts to $x^3$ as compared to the ratio $x$ of the execution shown in Fig. 1, presuming that the obliquity of the slanting faces remains the same.

What I claim is:

1. Shock-absorbing friction device, comprising buffing plates, adapted to mutually approach under draft or buffing strains, each having on its inner side a depression formed by faces placed obliquely to the direction of the buffing strains, two friction blocks placed between these oblique faces, each friction block having on its inner side a depression formed by faces placed obliquely to the direction of the movement of the blocks, and two other friction blocks inserted between the last-mentioned oblique faces, and rodding operatively connected with the inner friction blocks and extending outwardly relative to an end of at least one of said inner friction blocks and having resilient means connected therewith counteracting the movements of the inner friction blocks.

2. Shock-absorbing friction device according to claim 1, characterized by the feature that according to the principle described further friction blocks are encased into one another, in the inner friction blocks of the device and instead of the aforementioned resilient means the inmost pair is held separated by a spring.

3. Shock-absorbing friction device according to claim 1, characterized by the feature that the rodding is executed symmetrically and that two springs act upon the inmost friction blocks.

4. Shock-absorbing friction device according to claim 1, characterized by the feature that the device is connected in series with a preliminary spring which has such an initial tension that it begins to act before the shock-absorbing friction device properly speaking begins to work.

5. Shock-absorbing friction device according to claim 1, characterized by the feature that a preliminary spring is connected in series with the device and the spring acting upon the inmost friction blocks begins to work together with the preliminary spring, before the shock-absorbing friction device properly speaking begins to work.

6. Shock-absorbing friction device according to claim 1, characterized by the feature that auxiliary springs are inserted between the first pair of buffing plates, which act upon the further friction blocks, these auxiliary springs excluding the possibility of self-jamming.

7. In a shock-absorbing friction device, the combination of buffing plates each having converging inner faces, friction blocks interposed between the buffing plates and having flaring sides contacting the inner faces thereof, said friction blocks each having converging inner faces, inner friction blocks having wedge-shaped end portions engaging the inner faces of the first-mentioned friction blocks and movable inwardly toward each other from said inner faces, rodding having means connected therewith for operating on the inner friction blocks, and resilient means bearing in opposite directions on different portions of the rodding for counteracting movement of the friction blocks.

8. In a shock-absorbing friction device, the combination of buffing plates each having converging inner faces, friction blocks interposed between the buffing plates and having flaring sides contacting the inner faces thereof, said friction blocks each having converging inner faces, inner friction blocks having wedge-shaped end portions engaging the inner faces of the first-mentioned friction blocks and movable inwardly toward each other from said inner faces, telescoped rodding having means connected therewith for operating on the inner friction blocks, said rodding projecting externally of the space between the first-mentioned friction blocks, and resilient means externally of said space and bearing in opposite directions on different portions of the rodding for counteracting movement of the friction blocks.

9. Shock-absorbing friction device according to claim 1, characterized by a plurality of pairs of inner and outer friction blocks located between the buffing plates, and connected with the rodding, one pair of inner and outer friction blocks being located within the other pair thereof in series.

LÁSZLÓ KÜRTÖSSY.